Patented July 5, 1932

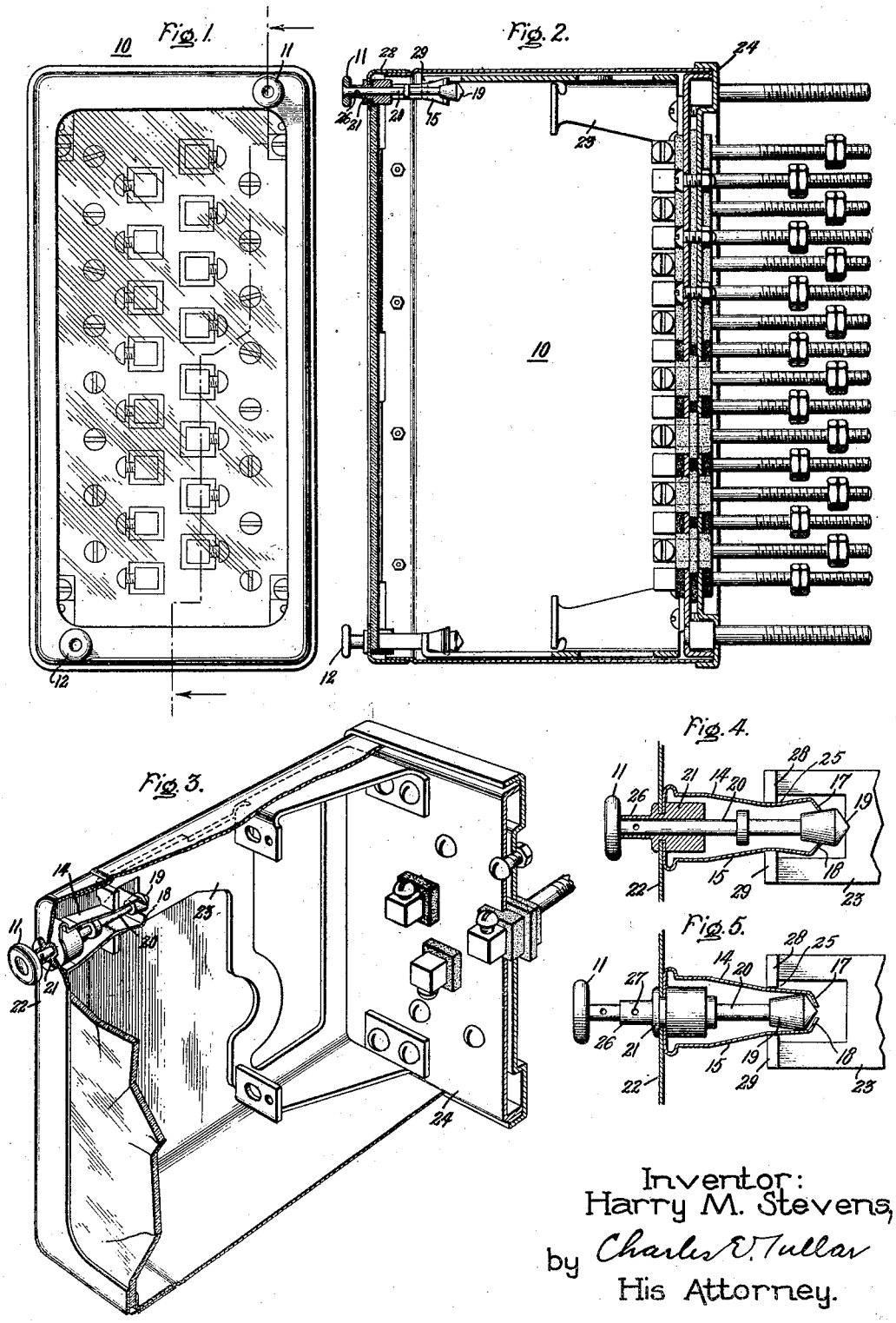

1,866,326

UNITED STATES PATENT OFFICE

HARRY M. STEVENS, OF SCHENECTADY, NEW YORK, ASSIGNOR TO GENERAL ELECTRIC COMPANY, A CORPORATION OF NEW YORK

CASING FOR ELECTRICAL DEVICES

Application filed September 12, 1928. Serial No. 305,519.

My invention relates to improvements in casings for electroresponsive devices such as relays, meters and the like and an object of my invention is to provide a simple and quickly operable means whereby to secure the cover of the casing to the base thereof and to permit sealing the cover in its closed position.

In casings for electrical devices such as relays and instruments, it is necessary to provide a cover which may easily and quickly be removed and which may be sealed against removal by any unauthorized person. In accordance with my invention, I have provided a simple fastening means which includes a member secured to the base of the casing, a yielding means cooperating with said member and attached to the cover and an operating member attached to the cover.

My invention will be better understood from the following description when considered in connection with the accompanying drawing, and its scope will be pointed out in the appended claim.

Referring to the drawing, Fig. 1 illustrates a front view of a casing equipped with a fastening device embodying my invention. Fig. 2 is a sectional view of the casing, and fastening device looking in the direction of the arrows of Fig. 1, and Figs. 3, 4 and 5 are other views clearly illustrating the construction of the fastening device.

In Fig. 1 a casing 10 is provided with operating members 11 and 12 of a fastening device embodying my invention. The fastening device as shown includes a yielding means such as spring members 14 and 15 biased towards each other and having their respective ends 17 and 18 bent towards each other. A wedge 19 mounted on a shaft 20 is adapted to force apart the ends 17 and 18. The shaft 20 is loosely mounted in a bushing 21, which is mounted in cover 22 of the casing 10. The springs 14 and 15 are attached to the cover 22 by suitable means such as the bushing 21.

Fig. 5 illustrates the springs 14 and 15 projecting into the bifurcated end of a bracket 23 attached to the base 24 of the casing and provided with spaced lugs 28 and 29. The wedge 19 in this figure is in position to permit the withdrawal of the cover 22. Fig. 4 illustrates the wedge 19 forced in between the ends 17 and 18 of the springs and clearly shows how they are forced apart to lock the cover in place. The resiliency of the springs 14 and 15 is such that the ends 17 and 18 will be spread more than the width of the slot 25 in the bracket 23. The bushing 21 is provided with a sleeve 26 having a hole 27 there through adapted to receive a sealing wire. When the wedge 19 is in the sealing position, a hole in shaft 20 registers with the hole 27 and the shaft 19 may be sealed in place. It is thus possible to remove the cover 22 by simply grasping and pulling the operating members 11 and 12 which are attached to the shafts 20. On the other hand the cover can be fastened to the base by simply pushing the operating members inward after the cover is replaced. Since the covers must be periodically removed for testing or inspection purposes a considerable saving in time, over previous methods is thereby obtained.

While I have shown and described my invention in considerable detail, I do not desire to be limited to the exact arrangements shown, but seek to cover in the appended claim all those modifications that fall within the true spirit and scope of my invention.

What I claim as new and desire to secure by Letters Patent of the United States, is:

In combination, a base, a cover and means for securing said cover to the base including two opposed spaced lugs mounted on said base, two opposed spring members mounted on the inside of the cover having their free ends biased toward each other to be spaced less than the distance between said lugs, and an operating member mounted on said cover between said springs and arranged on movement in one direction to spread the free ends of said springs apart more than the distance between said lugs whereby to fasten the cover to the base.

In witness whereof I have hereunto set my hand this 11th day of September, 1928.

HARRY M. STEVENS.